United States Patent [19]

Kobayashi et al.

[11] Patent Number: 4,755,899

[45] Date of Patent: Jul. 5, 1988

[54] MAGNETIC TRANSDUCER HEAD HAVING AN ALLOY THIN FILM OF HIGH SATURATION MAGNETIC FLUX DENSITY SLANTLY PROVIDED WITH RESPECT TO AN OPERATING MAGNETIC GAP FORMED THEREIN

[75] Inventors: Tomio Kobayashi; Heikichi Sato; Makoto Kubota; Shoichi Kano; Tatsuo Kumura; Kazushi Yamauchi; Yoshimi Takahashi; Junichi Saito, all of Miyagi, Japan

[73] Assignee: Sony Corporation, Tokyo, Japan

[21] Appl. No.: 686,540

[22] Filed: Dec. 26, 1984

[30] Foreign Application Priority Data

Dec. 30, 1983 [JP] Japan ............................ 58-250988

[51] Int. Cl.⁴ .................. G11B 5/127; G11B 5/23; G11B 5/187
[52] U.S. Cl. ..................... 360/125; 360/119; 360/122
[58] Field of Search .......... 360/119, 120, 122, 125, 360/127, 123, 126, 110

[56] References Cited

U.S. PATENT DOCUMENTS

| 3,502,821 | 3/1970 | Duinker | 360/119 |
| 4,361,860 | 11/1982 | Nozawa | 360/120 |
| 4,559,572 | 12/1985 | Kumasaka et al. | 360/110 |

FOREIGN PATENT DOCUMENTS

| 0000195 | 1/1968 | Japan | 360/127 |
| 0124112 | 9/1981 | Japan | 360/122 |
| 0169214 | 12/1981 | Japan | 29/603 |
| 0015217 | 1/1982 | Japan | 360/110 |
| 0189323 | 11/1982 | Japan | 360/119 |
| 0175122 | 10/1983 | Japan | 360/127 |

Primary Examiner—Robert S. Tupper
Assistant Examiner—Andrew L. Sniezek
Attorney, Agent, or Firm—Hill, Van Santen, Steadman & Simpson

[57] ABSTRACT

A magnetic transducer head comprising a first magnetic core element and a second magnetic core element, each of the first and second core elements comprising a magnetic ferrite block and a magnetic metal thin film integrated with the magnetic ferrite block. These core elements having a first planar surface and a second planar surface. The magnetic metal thin film being provided on the second planar surface and having an edge thereof facing to the first planar surface, and the second planar surface being slantly provided with respect to said first planar surface. These core elements being bonded together to form an operating magnetic gap between the edge of the magnetic metal thin film on the first core element and the edge of the magnetic metal thin film on the second core element. The magnetic metal thin film on the first core element or the magnetic thin film on the second core element is formed in one common plane.

The magnetic metal thin film may be formed of the ferromagnetic metals including Fe—Al—Si alloys, amorphous metal alloys or permalloy. And the magnetic metal thin film having substantially uniform columnar grain structure or uniform magnetic anisotropy, over entire area of the film.

29 Claims, 17 Drawing Sheets

MAGNETIC TRANSDUCER HEAD HAVING AN ALLOY THIN FILM OF HIGH SATURATION MAGNETIC FLUX DENSITY SLANTLY PROVIDED WITH RESPECT TO AN OPERATING MAGNETIC GAP FORMED THEREIN

BACKGROUND OF THE INVENTION

1. Field of the Invention

This invention relates to a magnetic transducer head and more particularly to such a head formed of composite magnetic material, viz. the ferromagnetic oxide material and the ferromagnetic metal material.

2. Description of the Invention

With increase in recording density on magnetic tapes used as recording media for video tape recorders (VTRs), magnetic tapes having a high residual flux density Br and a high coercive force Hc, for example metal magnetic tape in which metal magnetic powder is coated on a non-magnetic substrate with a binder to form a magnetic recording layer, are being used in increasing numbers. When the magnetic transducer head is to be used with the metal tape, the magnetic field strength of the magnetic gap of the head must be elevated in order to cope with the high coercive force of the tape. It is also necessary to reduce the track width of the magnetic transducer head with increase in recording density. There are known various magnetic transducer heads designed to meet these demands, such as the magnetic transducer head with the narrow track width shown in FIG. 1. The major portion of the magnetic transducer head shown in FIG. 1 is formed of glass or the like non-magnetic materials 1A, 1B, and a ferromagnetic metal thin film 2 having a thickness equal to the track width is sandwitched between these non-magnetic materials centrally of the magnetic head. This film 2 is prepared by forming a high permeability alloy such as Sendust (fe—Al—Si alloys) on the non-magnetic material 1A in the form of a core half by physical vapor deposition, such as sputtering. While the track width can be reduced in this manner, the path of magnetic flux is defined only by the metal thin film 2 and hence the operational efficiency is lowered by reason of increased magnetic reluctance. The metal thin film 2 needs to be formed to a film thickness equal to the track width by the physical vapor deposition such as sputtering. Hence the preparation of the magnetic head is considerably time-consuming in view of the low deposition rate achievable with the physical vapor deposition. Since the film 2 needs to be formed on a large area, the number of items that can be dealt with by a sputtering unit is necessarily limited so that the heads cannot be mass-produced efficiently. The metal films 2 of extremely small film thickness are placed in contact with each other for formation of the magnetic gap of the magnetic transducer head, with the result that accuracy in the gap size and hence the operational reliability are lowered.

The magnetic transducer head shown in FIG. 2 is prepared in such a manner that, for increasing the magnetic field strength of the magnetic gap, ferromagnetic metal thin films 4 such as Sendust are formed on the magnetic gap forming surfaces of the core halves of ferromagnetic oxides by using a physical vapor deposition, such as sputtering, and the core halves are bonded together by the glass 5. Although the magnetic reluctance of the magnetic transducer head of FIG. 2 formed of the composite magnetic material can be made lower than in the case of the transducer head shown in FIG. 1, the films 4 are formed in a direction normal to the path of magnetic flux so that the playback output is lowered because of eddy current loss. Additional gaps may also be formed between the ferromagnetic oxide cores 3 and metal magnetic films 4 thus detracting from the operational reliability of the transducer head.

Also known is a magnetic transducer head formed of composite magnetic material and having its magnetic gap forming surface inclined with respect to its surface forming the ferromagnetic metal film. For example, FIG. 3 shows in plan view the contact surface with the magnetic tape of the magnetic transducer head described in a Japanese Patent Kokai No. 155513/1983.

The magnetic transducer head shown in FIG. 3 is comprized of core halves or core elements 150, 151 formed of ferromagnetic oxides, such as Mn—Zn ferrite. Ferromagnetic metal thin films 155, 156 such as Sendust are deposited on both sides of and astride ferrite portions 153, 154 projecting towards a surface forming the magnetic gap 152. The numeral 157 designates a reinforcing glass material. The magnetic gap of the head is formed by the thin films 155, 156 of a ferromagnetic metal material deposited in the neighborhood of the tip ends of the projecting ferrite portions 153, 154. With these films 155, 156 of the ferromagnetic metal material, the growth direction of the columnar grain structure at the tip ends of the projecting ferrite portions 153, 154 is different from that at both inclined sides thereof, in such a manner that the crystals grow on both sides in parallel and uniformly with a constant angle relative to said sides whereas the crystals growths at the tip ends are in a fan shape that is, the crystals are spread apart towards their distal ends. The result is that magnetic permeability of the ferromagnetic thin films 155, 156 formed on the tip ends is lowered with resultingly lowered recording characteristics and playback output of the magnetic head.

It would be worthwhile to consider here as to know the surface conditions of e.g. the ferrite substrate surface affect the film forming process when the ferromagnetic metal thin film is formed by physical vapor deposition on the ferrite substrate.

In general, a thin magnetic film to be formed by a physical vapor deposition process is affected in known manner by the under-layer conditions. Besides the crystal structure of the substrate and of the under-layer film formed as an extremely thin under-layer on the substrate, also noteworthy are the geometrical configuration and uniformity of the substrate surface.

FIG. 4A is a photograph taken with a scanning electron-microscope (SEM) of a two-layered Sendust film formed by sputtering on the ferrite substrate with a $SiO_2$ film 500 Å thick between the Sendust layers. This figure shows, along with another SEM photograph of FIG. 5A, the effect of the ferrite substrate surface configurations on the film formation. FIGS. 4B and 5B are sketches showing only the main features appearing in the photographs of FIGS. 4A and 5A, respectively.

FIG. 4A shows the Sendust film formed on a planar ferrite substrate surface. As seen from this photograph, Sendust film surfaces 159A, 159B formed on the planar surface are uniform and the growth of the columnar grain structure of the crystals appearing in sections 160A, 160B of the Sendust film is uniform and extends parallel to the thickness of the film. In this photograph, the broken section is taken not only of the Sendust film but of the ferrite substrate and the broken section is viewed with the scanning electron-microscope from an oblique direction. On the section of the ferrite substrate 161 is seen the section 160A of the first Sendust layer followed by the section 160B of the second Sendust layer. The film surfaces 159A, 159B belong to the first and second Sendust layers, respectively. The thin lines appearing on the surface 159B of the second Sendust layer represent micro line imperfections on the polished surface of the ferrite slice propagated to the Sendust film and do not affect the magnetic permeability of the film. The photograph is shown in a topsy-turvy state, that is, with the upper side down and vice versa.

FIG. 5A shows the Sendust film formed on an irregular surface of the ferrite substrate. The photograph shows the irregular surface 162 of the Sendust film corresponging to the original irregular surface ferrite substrate. This is indicative of the competitive growth of the crystal grains that is not observed when the crystals are allowed to grow on a smooth planar surface. Also the direction of the columnar crystal growths are not parallel, as may be seen in a section 163 of the Sendust film, but the columnar crystal growths are spread apart in a fan shape on the protuberant portions of the ferrite substrate. In the present SEM photograph, the broken section is taken not only of the Sendust film but of the ferrite substrate and the viewing direction is from the oblique upper side. A Sendust film section 163 is seen above a ferrite substrate section 164. A boundary line 164A between the sections 163, 164 represents a protuberant portion on the ferrite substrate surface.

The Sendust film formed on the ferrite substrate having recesses and protuberances present the direction of columnar crystal growths different with the inclination of the recesses. Thus the direction and size of the columnar crystals are different with the profile and inclination of the bottom of the substrate recess. The Sendust film surface 162 is also disturbed and the crystal structure of the film differs markedly with different inclination on the bottom of the recess. Such differnce in the crystal grain structure accounts for a great difference in the magnetic permeability of the Sendust film. The photograph in this figure is again taken in a topsy-turvy position.

It should be noted that, because magnetic permeability as well as anisotropic properties (the direction of easy magnetization) of a ferromagnetic film depends notably on the film structure, it is desirable that the magnetic film that makes up a magnetic transducer head, especially one used for magnetic recording and reproduction, be uniform in structure. For instance, it is required that columnar crystals of the aforementioned Sendust film should grow uniformly and in one direction. Should the orientation of crystal growth not be uniform in a magnetic film, a certain portion of the film exhibits proper magnetic properties while the remaining portion thereof exhibits inferior magnetic properties (effect of anisotropy).

In FIG. 6, there is schematically shown the structure of a Sendust film, that is, the orientation of the columnar crystal growths, when the Sendust film is deposited as by sputtering on and astride the projecting portion of the ferrite substrate shown in FIG. 3. It is seen from FIG. 6 that columnar crystals of the Sendust film 171 grow uniformly and parallel to each other on both sides 170A of the projecting portion 170 but are spread apart from each other towards the distal ends at a tip end 170B. When the Sendust film 171 deposited on the tip end 170B is ground for forming a magnetic gap surface 172, the film structure at or near the gap surface 172 is different from that on the sides 170A. Thus, with the magnetic transducer head of the composite magnetic material making use of the Sendust film 171 deposited on the projecting portion 170, when the Sendust film 171 on the sides 170A exhibits higher magnetic permeability in the direction of the path of magnetic flux, the film 171 near the tip end 170B exhibits only poor magnetic permeability.

Instead of depositing, for instance, a Sendust film on and astride the projecting portion of the ferrite substrate, it is also feasible to deposit the Sendust film 177 only on one side of the projecting portion 175, as by sputtering, with a masking plate 176 placed to cover the other side of the projecting portion 175. However, the masking plate 176 gives rise to a shadowing effect because a plate thickness in excess of several tens of microns is required in consideration of handling and mask-alignment and by reason of molding constraints. As a result of the shadowing effect, the film structure of the Sendust film 177 formed in the vicinity of the tip end 175B of the projecting portion 175B and hence magnetic permeability characteristics are different from those of the film structure on the side 175A. Thus, when the Sendust film 177 deposited on the tip end 175B is ground to a magnetic gap surface 178 of the magnetic transducer head, it is not possible with this magnetic head to provide both the film portion on the tip end 175B and the film portion on the side 175A with high magnetic permeability along the path of magnetic flux.

It is also feasible to get the gap surface ground further so as to render the film structure at the tip end 175B of the Sendust film identical with that at the side 175A. However, in this case, the ferrite portion is exposed on the magnetic gap surface 179 of the magnetic head, with the resulting inconvenience that a sufficient magnetic recording cannot be obtained on the track portions of the high coercive force magnetic tape, such as metal tape, corresponding to the width of the exposed ferrite portion.

FIGS. 11 and 12 show in plan views two further examples of the contact surface with the tape of the prior-art magnetic heads, with the magnetic gap portion being shown to an enlarged scale. With the magnetic head shown in FIG. 11, the Sendust films 183 for example are provided only on both sides of the ferrite portions projecting towards the planar surface 180 forming the gap and the ferrite portion is exposed on the planar surface 180 forming the gap. The numeral 184 designates a reinforcing glass packing material. This magnetic transducer head makes use of the Sendust film 183 formed on the planar surface and hence does not suffer from the above described non-uniform film structure. However, the magnetic recording on a high coercive force magnetic tape is insufficient by a width of the ferrite portion exposed on the magnetic gap surface, and the magnetic recording characteristics and playback output is correspondingly lowered.

In the magnetic transducer head shown in FIG. 12, a Sendust film 187, for example, is formed on ferrite portions and non-magnetic glass having high melting point portions 188 of core elements 185, 186, so that the head is formed of composite magnetic material, viz. ferrite and Sendust. The numeral 190 designates a glass 190 having melting point lower than that of glass 188. The magnetic gap 189 of the magnetic transducer head is formed by the portions cf the Sendust film 187A running parallel to the path of magnetic flux so that the Sendust film 187A in the vicinity of the magnetic gap 189 is of a uniform film structure. However, the Sendust film portion, 187B corresponding to the bend or knee of the Sendust film 187 and thus extending over two planar surfaces is not of uniform film structure, so that Sendust film 187 as a whole is not constant in magnetic permeability. Also, in this magnetic transducer head, the Sendust film portion 187A needs to be of a film thickness corresponding to the track width. Because of the slow deposition rate of the film possible with the physical vapor deposition, the process of fabrication of the magnetic transducer head is time-consuming.

The Japanese Patent Kokai No. 169214/1981 shows a magnetic transducer head in which, as shown in FIG. 13, junction surfaces 195, 196 of magnetic alloy films 191, 192 and ferrite portions 193, 194 are at an acute angle with respect to the confronting surfaces of the head gap 197 or to a direction normal to the relative running direction of the magnetic recording medium. However, with the magnetic transducer head shown in FIG. 13, the magnetic alloy films 191, 192 are mounted in opposition to each other in other portions than the head gap 197 so that a crosstalk may be caused especially in the longer wavelength signals by picking up the signals of neighboring tracks or the signals of every other track and a means for avoiding this effectively has not been found to date. In addition, local wear may be caused by the head gap 197 offset to one side edge of the head chip. The magnetic alloy films 191, 192 abut on each other in such a manner that the direction of columnar crystal growths of the film 191 does not coincide with that of the film 192 and uniform magnetic properties are difficult to achieve with the head gap 197.

Although the crystalline Sendust film has been given hereinabove as an example of a thin ferromagnetic film, a uniform film structure is also required when an amorphous alloy is used for forming the thin film. Since the film is amorphous, it is not the uniformity in the crystal grain structure but the uniformity in magnetic anisotropy that matters. If the amorphous alloy is deposited on a planar surface for forming a thin film, magnetic anisotropy is identical throughout the film. However, when the alloy is deposited astride a projecting portion and a planar portion, the magnetic domain structure or the magnetic permeability is not uniform.

SUMMARY OF THE INVENTION

In view of the above described prior art devices, it is a primary object of the present invention to provide a magnetic transducer head which may be advantageously mass-produced and which is suitable for high density recording on a magnetic tape exhibiting a higher coercive force Hc, such as metal tape.

It is also an object of the present invention to provide a high output magnetic transducer head which is reliable in operation and exhibits uniform film characteristics of the thin ferromagnetic metal film in the neighborhood of the magnetic gap.

It is a further object of the present invention to provide a magnetic transducer head free of local wear and exhibiting superior wear resistance.

According to an aspect of the present invention, there is provided a magnetic transducer head comprising; a first magnetic core element, and a second magnetic core element, each of said first and second core elements comprising a magnetic ferrite block and a magnetic metal thin film integrated with said magnetic ferrite block, said core element having a first planar surface and a second planar surface, said magnetic metal thin film being provided on said second planar surface and having an edge thereof facing to said first planar surface, said second planar surface being slantly provided with respect to said first planar surface, said first and second core elements being bonded together to form an operating magnetic gap between said edge of said magnetic metal thin film on said first core element and said edge of said magnetic metal thin film on said second core element, and to form said magnetic metal thin film on said first core element and said magnetic thin film on said second core element in one common plane.

DESCRIPTION OF THE PREFERRED EMBODIMENTS

Figure 1:
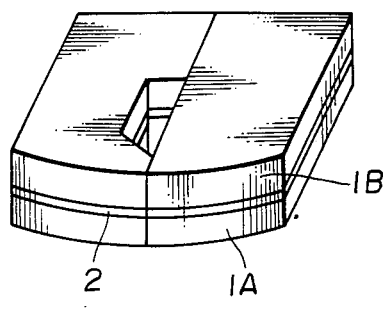
FIGS. 1 and 2 are perspective views showing two examples of the conventional magnetic transducer heads.
Figure 2:
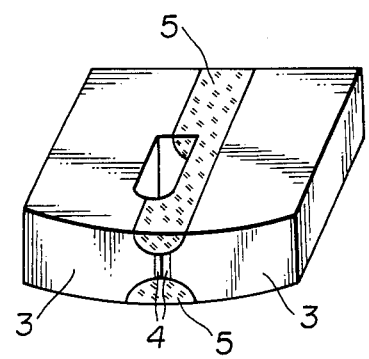

Referring to the drawings, several preferred embodiments of the present invention are explained in detail.

Figure 14:
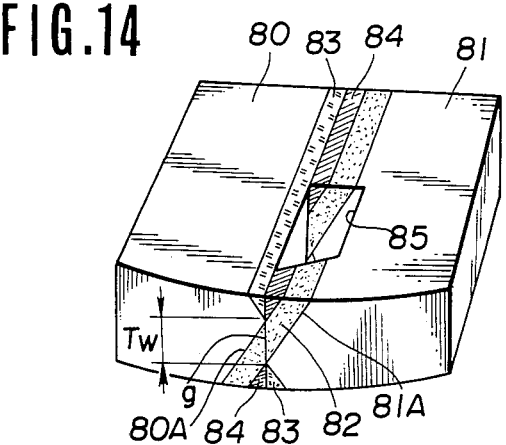
FIG. 14 is a perspective view showing a magnetic transducer head according to an embodiment of the present invention.

Referring first to FIG. 14, a magnetic transducer head according to the first embodiment of the present invention is explained, in which a ferromagnetic metal thin film is formed continuously from the front side or the front gap forming surface to the back side or the back gap forming surface of te magnetic transducer head.

This head is composed of core elements 80, 81 formed of ferromagnetic oxides, such as Mn—Zn ferrite. On the junction surfaces of the core elements 80, 81 there are formed metal thin films 82 of ferromagnetic metal or high permeability metal alloy, such as Fe—Al—Si alloys, by using the physical vapor deposition, such as sputtering. These films 82 are continuously formed from the front gap forming surface to the rear gap forming surface. A magnetic gap g is formed only by these thin films 82. These films 82 on the core elements 80, 81 extend as an oblique straight line when viewed on the tape contact surface, if the small thickness of these films 82 is disregarded. The humerals 83, 84 designate reinforcing non-magnetic sections filled in cutout portions adjacent to the junction surface and also used for setting a track width Tw. The numeral 85 designates an opening for coils.

The metal thin films 82 are formed on a sole planar surface defined by one inclined surface 80A of the core element 80 and one inclined surface 81A of the core element 81. Therefore, the metal thin films 82 are of uniform film structure in their entirety and exhibit a high magnetic permeability in the direction of the path of magnetic flux for improving the recording characteristics and increasing playback output of the magnetic transducer head.

Figure 15:
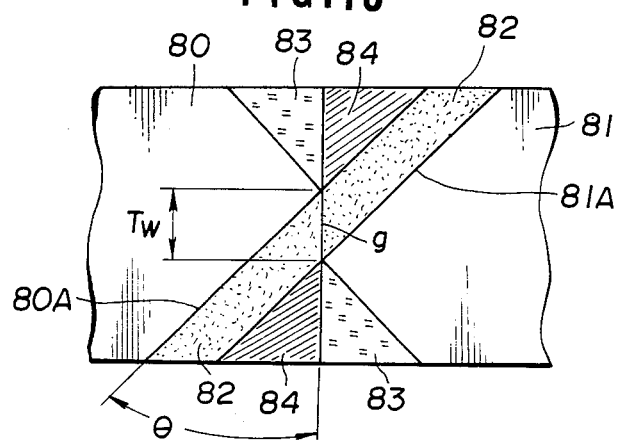
FIG. 15 is an enlarged plan view showing the contact suface with the tape of the magnetic transducer head shown in FIG. 14.
Figure 16:
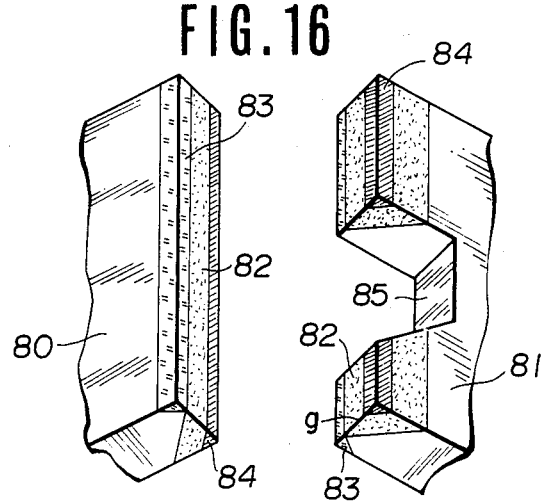
FIG. 16 is an exploded perspective view of the head shown in FIG. 14, with the explosion being on the core separation plane.

The surface of forming the thin films 82 forms an acute angle $\theta$ with the surface of forming the magnetic gap g, as shown in FIG. 15 showing the contact surface with the magnetic tape in a plan view. In the present embodiment, the angle $\theta$ is selected to a relatively small value of approximately 45° so that the interaction of the magnetic gap g with the interface between the inclined surface 80A, 81A and the thin films 82 is negligible.

The deposited metal thin films 82 need only to be of a film thickness t such that $$t = Tw \sin \theta$$

Wherein Tw represents a track width and $\theta$ represents an angle between the surface of forming the metal thin film and the surface of forming the magnetic gap. The result is that the film need not to be deposited to a thickness equal to the track width and hence the time required for the preparation of the magnetic transducer head may be notably reduced.

It should be noted that the angle $\theta$ of 45° between the surface of forming the films 82 and the surface of forming the magnetic gap g is not limitative and may also be in the range from about 20° to about 80°. However, the angle more than 30° is preferred because crosstalk with the neighboring track is increased with the angle $\theta$ less than 20°. The angle $\theta$ less than about 80° is preferred because wear resistance is lowered with the angle equal to 90°. The angle $\theta$ equal to 90° also is not preferred because the thickness of the thin films 82 of the ferromagnetic metal need to be equal to the track width which gives rise to the non-uniform film structure and the time-consuming operation in forming the thin film in vacuum, as described hereinabove.

The metal thin films 82 may be formed of the ferromagnetic metals including Fe—Al—Si alloys, Fe—Al alloys, Fe—Si—Co alloys, Ni—Fe alloys (so-called permalloys), ferromagnetic amorphous metal alloys, or so-called amorphous alloys, such as metal-metalloid amorphous alloys, e.g. an alloy of one or more elements selected from the group of Fe, Ni and Co with one or more elements selected from the group of P, C, B and Si, or an alloy consisting essentially of the firstly mentioned alloy and containing Al, Ge, Be, Sn, In, Mo, W, Ti, Mn, Cr, Zr, Hf or Nb, or a metal-metal amorphous alloy consisting essentially of transition metal elements and glass forming metal elements such as Hf or Zr.

Preferably, the composition of the Fe—Al—Si alloys is so selected the Al contents are in the range from 2 to 10 weight percent, and the Si contents are in the range from 4 to 15 weight percent, the balance being Fe. Thus it is preferred that, when the Fe—Al—Si alloys are expressed as

$$Fe_aAl_bSi_c$$

Where a, b, and c represent the weight ratio of the respective associated caomponents, the values of a, b and c are in the range such that $70 \leq a \leq 95$
$2 \leq b \leq 10$
$4 \leq c \leq 15$.

If the Al of Si contents are too low or too high, magnetic properties or the Fe —Al—Si alloys are lowered.

In the above composition, a part of Fe may be replaced by at least one of Co and Ni.

The saturation magnetic flux density may be improved by replacing a part of Fe with Co. Above all, the maximum saturation magnetic flux density Bs may be achieved when 40 weight percent of Fe is replaced by Co. Preferably, the amount of Co is 0 to 60 weight percent relative to Fe.

On the other hand, by replacing a part of Fe with Ni, magnetic permeability may be maintained at a higher value without lowering the saturation magnetic flux density Bs. In this case, the amount of Ni is preferably in the range from 0 to 40 weight percent relative to Fe.

Other elements may also be added to the Fe—Al—Si alloys for improving its corrosion and wear resistance. The elements that may be used as such additives may include IIIa group elements including lanthanides such as Sc, Y, La, Ce, Nd and Gd; IVa group elements such as Ti, Zr or Hf; Va group elements such as V, Nb or Ta; Via group elements such as Cr, Mo or W; VIIA group elements such as Mn, Te or Re; Ib group elements such as Cu, Ag or Au elements of the platinum group such as Ru, Rh, Pd, Os, Ir, or Pt; and Ga, In, Ge, Sn, Sb or Bi.

As film forming process, any known physical vapor deposition may be employed, such as flash evaporation, ion plating, sputtering or cluster ion beam process.

It is therefore preferred that the metal thin films 82 be deposited in such a manner that the direction of the columnar crystal growths be inclined at a predetermined angle of 5° to 45° with respect to a normal line drawn to each of the inclined planar surfaces 80A, 81A.

When the metal thin films 82 are caused to grow in this manner at a predetermined angle with respect to the normal lines drawn to the inclined surfaces 80A, 81A, magnetic properties of the resulting metal thin films 82 are stable and superior resulting in improved magnetic properties of the magnetic transducer head.

Although the metal thin film 82 is formed as single layer by the above described physical vapor deposition, a plurality of thin metal layers may also be formed with electrically insulating film or films such as $SiO_2$, $Ta_2O_5$, $Al_2O_3$, $ZrO_2$ or $Si_3N_4$ between the adjacent thin metal layer or layers. Any desired number of the ferromagnetic metal layers may be used for the formation of the metal thin film.

Since the magnetic gap g is formed only by the metal thin films 82 endowed with high magnetic permeability, the magnetic transducer head has a high recording characteristics and playback output compatible with the magnetic tape exhibiting high coercive force Hc, such as metal tape.

Since the metal thin films 82 are formed on a common planar surface such as inclined surface 80A of the projecting portion of the core element 80 or inclined surface 81A of the projecting portion, the film structure of the metal thin film 82 (Fe—Al—Si alloys film), viz. the orientation of the columnar crystal growths is uniform and parallel not only in the neighborhood of the magnetic gap g but on the overall surface of the inclined sides 80A, 81A. The result is that the metal thin film 82 shows high magnetic permeability in its entirety along the path of magnetic flux for improving the recording characteristics and increasing playback output of the magnetic transducer head.

The contact surface with the tape of the magnetic transducer head is substantially formed of ferromagnetic oxides wear resistance of the head is also improved.

In distinction from the conventional practice according to which ferromagnetic metal foils are manually applied with the aid of glass, organic adhesives or inorganic adhesives, the metal thin films 82 are provided by physical vapor deposition so that the films are more homogenous and the operational reliability of the transducer head is also improved.

According to the present invention, track widths in the range from several to several tens of microns can be formed easily and a narrow track may be provided to the head by reducing the number of layers or film thickness of the metal thin film 82.

The magnetic transducer head described hereinabove may be used advantageously for high density recording on a magnetic tape with high coercive force Hc by virtue of the high magnetic field strength of the magnetic gap g and the enhanced playback output.

For clarifying the structure of the magnetic transducer head of the present embodiment, the manufacture process thereof will be explained below by referring to FIGS. 17 to 23.

Figure 17:
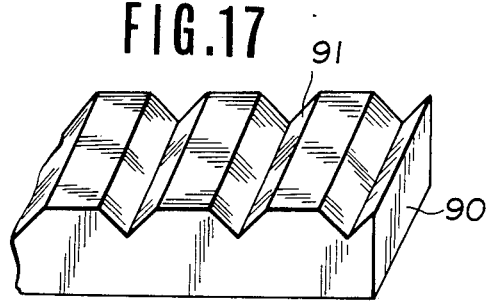
FIGS. 17 to 23 are perspective views showing the sequential steps for fabrication of the magnetic transducer head shown in FIG. 14.

In preparing the magnetic transducer head of the present embodiment, a plurality of vee grooves 91 are transversely formed on the upper surface of a substrate 90 of ferromagnetic oxides, such as Mn—Zn ferrite, with the aid of a revolving grindstone (FIG. 17).

These grooves 91 may also be polygonal in cross-section and the inner wall surface of these grooves 91 may be bent in two or more steps for enlarging the distance between the ferromagnetic oxides and the ferromagnetic metal thin film. With such groove profile, high-output magnetic transducer heads with less crosstalk may be obtained in the longer wavelength range while maintaining a large junction area between the ferromagnetic oxide on one core half and the ferromagnetic metal thin film on another core half.

Figure 18:
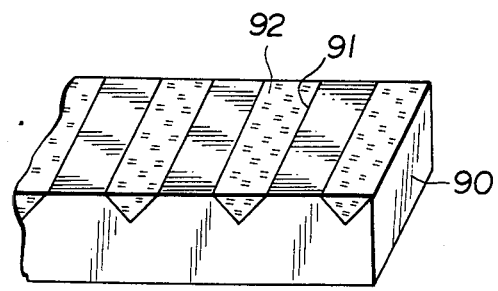

Next, glass having high melting point 92 is filled in a molten state in the grooves 91, after which the substrate surface is ground smooth (FIG. 18).

Figure 19:
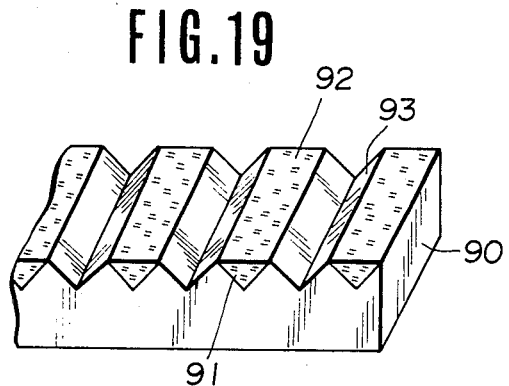

Next, a plurality of vee grooves 93 are formed so as to be adjacent to and not to overlap with the aforementioned vee grooves 91. The inner wall surface of each groove 93 makes an angle of e.g. 45° with respect to the upper substrate surface (FIG. 19).

Figure 20:
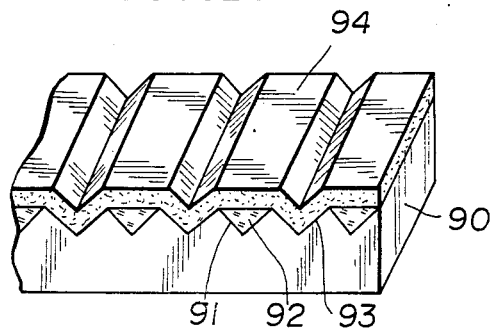

Then a ferromagnetic alloy, such as Fe—Al—Si alloys, is deposited on the upper surface of the substrate 90 by any known physical vapor deposition such as sputtering, ion plating or vacuum evaporation, thereby forming a metal thin film 94 in the vee grooves 93 (FIG. 20).

Figure 21:
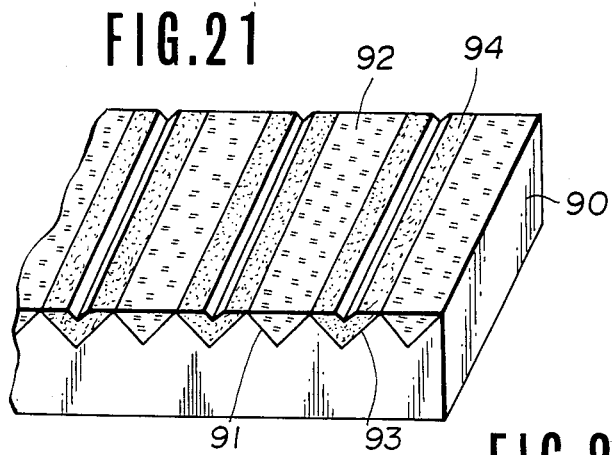

Then the upper and front surfaces of the substrate 90 are ground smooth and removing the metal thin film on the surface of the substrate (FIG. 21).

Figure 22:
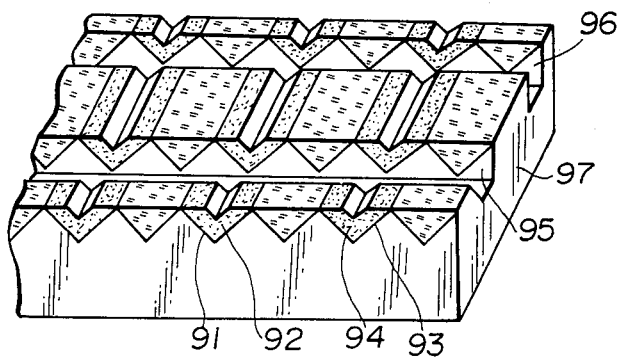

For forming the core element on the winding groove side, a groove for coils 95 in the resulting magnetic transducer head and a glass filling groove 96 are cut on the thus processed substrate 90 (FIG. 21) for providing a substrate 97 formed of ferromagnetic oxide (FIG. 22).

Figure 23:
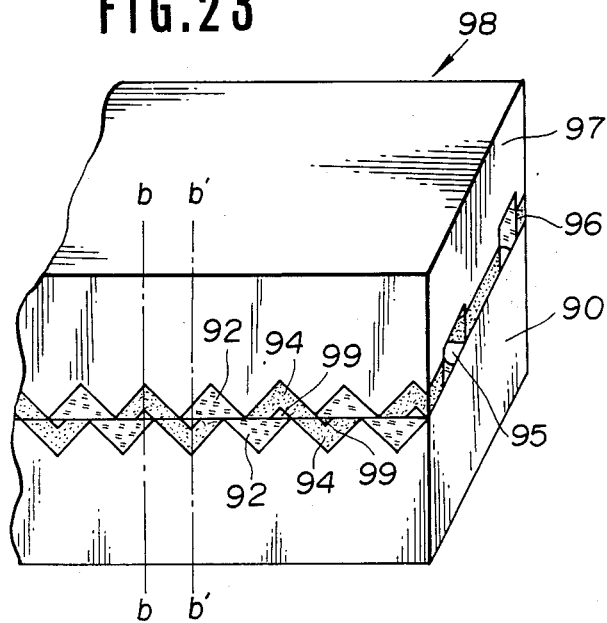

The substrates 90 and 97 are then stacked together by placing a gap spacer therebetween and with the respective planar surfaces provided with the metal thin films 94 facing to each other. Low melting glass rods are inserted into the groove for coils 95 and the glass filling groove 96 for melt-bonding the substrates together into one block 98. At this time, glass having low melting point 99 is filled into the remaining grooves on the metal thin films 94 of the substrates 90, 97 (FIG. 23).

The block 98 is then cut along lines b—b and b'—b' for providing a plurality of head chips.

The contact surface of each head chip with the magnetic tape is then ground to a cylindrical profile for producing the magnetic transducer head shown in FIG. 14. This magnetic transducer head has its core element 80 derived from substrate 90 and another core element 81 derived from substrate 97. The metal thin film 82 corresponds to the metal thin film 94, the non-magnetic filling material 83 to the glass having high melting point 92 and the non-magnetic filling material to the glass having lower melting point 99. The opening for coils 85 corresponds to the groove for coils 95.

Figure 24:
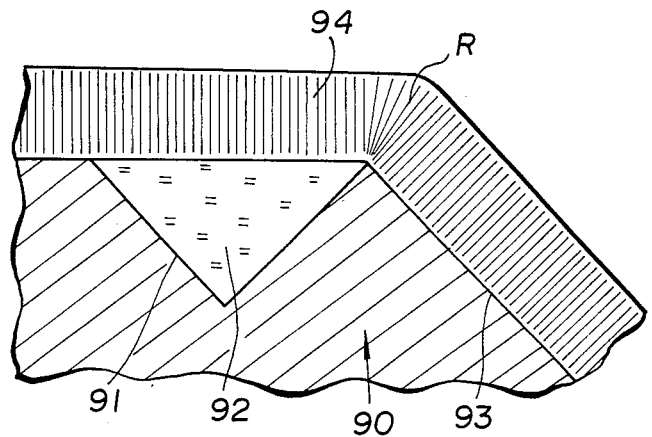
FIGS. 24 and 25 are schematic sectional views showing the orientation of the columnar crystal growth of the ferromagnetic metal film (Fe—Al—Si alloys film) formed on the substrate at the process steps shown in FIGS. 20 and 21, respectively.
Figure 25:
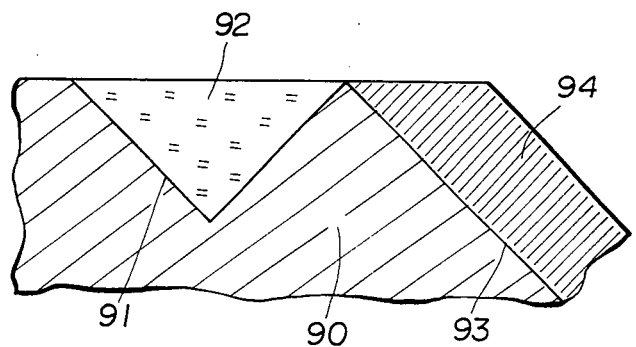

In FIGS. 24 and 25, sections through the substrate 90 are taken at the steps shown in FIGS. 20 and 21, respectively, for illustrating the film structure of the metal thin film 94 (Fe—Al—Si alloys film) or the orientation of the columnar crystal growths. As shown in these figures, a non-uniform film structure portion R is ground off during the gap surface grinding step shown in FIG. 21 so that only the metal thin film 94 having a uniform film structure is left on the inclined surface of the groove 93. The rusult is that the magnetic transducer head having a high and stable output may be obtained because each portion of the metal thin film 82 formed on the common planar surface may have a high permeability along the path of magnetic flux.

A modified embodiment in which the ferromagnetic metal thin film is formed only in the vicinity of the magnetic gap is hereafter explained.

Figure 26:
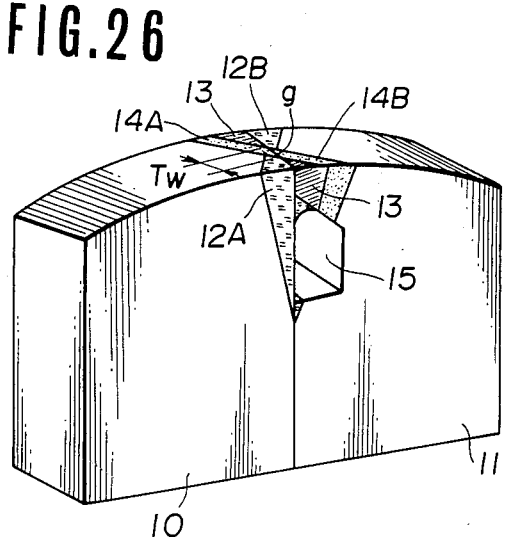
FIG. 26 is a perspective view of a magnetic transducer head according to a modification.

FIG. 26 shows in perspective the magnetic transducer head according to the present modification. The magnetic transducer head is formed of a composite magnetic material and consists of a pair of core elements 10, 11 of ferro-magnetic oxides such as Mn—Zn ferrite. In the vicinity of the magnetic gap g, there are formed metal thin films 14A, 14B of ferromagnetic metal or high permeability metal alloy, such as Fe—Al—Si alloys, by using the physical vapor deposition, such as sputtering. Non-magnetic packing materials 12A, 12B and 13 are packed in molten state in the neighborhood of the planar surface of the magnetic gap g.

Figure 27:
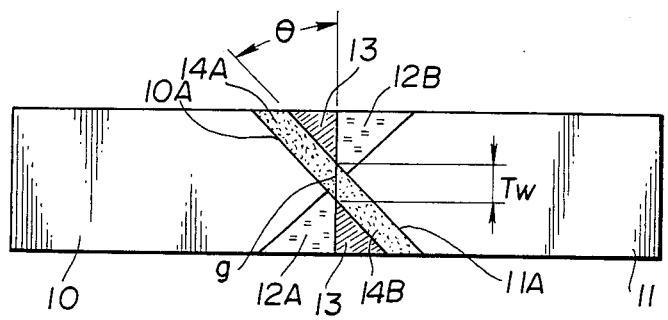
FIG. 27 is an enlarged plan view showing the contact surface with the tape of the magnetic transducer head shown in FIG. 26.

It should be noted that the planar surface forming the metal thin films 14A, 14B and the planar surface forming the magnetic gap g are inclined to each other at an angle $\theta$ as shown in FIG. 27 showing the contact surface with the tape of the magnetic transducer head. In the present embodiment, the angle $\theta$ is approximately 45

Since the metal thin films 14A, 14B are formed only in the vicinity of the magnetic gap g, the film surface may be reduced with the result that the number of unit chips that can be processed at a time by e.g. sputtering can be notably increased with improved efficiency in mass production. With increase in the number of magnetic transducer heads that can be produced from a unit film area, manufacture costs of the magnetic transducer heads may be lowered.

On account of the reduced area of the metal thin films 14A, 14B on the core elements 10, 11 of the ferromagnetic oxides, any strain of the metal thin films 14A, 14B caused by the difference in the coefficients of thermal expansion of the core elements and the metal thin films or resulting break or crack occurrence in the core elements 10, 11 may be avoided with improved operational efficiency and yield rate in the manufacture of the magnetic transducer heads.

The metal thin films 14A, 14B of high magnetic permeability defining the magnetic gap g are formed in the vicinity of the magnetic gap g, and the rear side of the head is formed by ferromagnetic oxides with a large junction surface, so that the head exhibits an improved performance with lesser magnetic reluctance and high sensitivity.

Since the magnetic gap g is formed only by the ferromagnetic metal thin films 14A, 14B of high magnetic permeability, the head has a high recording characteristics and playback output compatible with magnetic tapes of high coercive force such as metal tape.

The metal thin film 14A is formed on a planar surface on the non-magnetic pakcing material 12A and the side 10A of the projecting portion of the core element 10, while the metal thin film 14B is formed on a planar surface on the non-magnetic packing material 12B and the side 11A of the projecting portion of the core element 11. Hence, the film structure or the orientation of the columnar crystal growths of the metal (Fe—Al—Si alloys) thin films 14A, 14B is uniform and parallel both in the neighborhood of the magnetic gap g and on the sides 10A, 11A. The result is that the metal thin films 14A, 14B exhibit in their entirety a high magnetic permeability in the direction of the path of magnetic flux so that the recording characteristics and playback output of the magnetic transducer head is notably improved.

The rear sides of the magnetic transducer head are united together with the ferromagnetic oxides such as Mn—Zn ferrite abutting to each other so that a large bonding strength may be achieved with improved yield rate despite inferior bonding properties between the metal thin films 14A, 14B and the core elements 10, 11. There is no risk that back track deviation be caused during processing, thus resulting in an improved operational reliability of the magnetic transducer head.

Since the majority of the contact surface with the tape of the magnetic transducer head is formed of ferromagnetic oxides, wear resistance of the magnetic transducer head is also improved.

In distinction from the conventional practice in which ferromagnetic metal foils are manually bonded one upon the other with an adhesive layer of glass, organic adhesives or inorganic adhesives, the metal thin films 14A, 14B are formed by a physical vapor deposition, so that the formed film is homogeneous for further improving the operational reliability of the magnetic transducer head.

The track width can be easily selected in a wide range from several to several tens of microns so that the magnetic transducer head with a narrow track width may be obtained by using a reduced film thickness or a reduced number of film layers.

As described hereinabove, the magnetic transducer head of the present embodiment has a high magnetic field strength of the magnetic gap g and a high playback output, so that it is superior in operational reliability and productivity and suitable for high density recording on a magnetic tape having a high coercive force Hc such as metal tape.

The manufacture process for the magnetic transducer head shown in FIG. 26 is now explained by referring to FIGS. 28 to 34.

Figure 28:
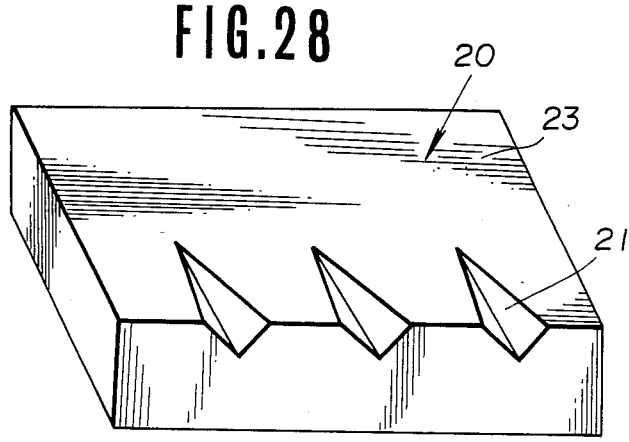
FIGS. 28 to 34 are perspective views showing the sequential steps for the manufacture of the magnetic transducer head shown in FIG. 26.

On a longitudinal ridge of a substrate 20 of a ferromagnetic oxide, such as Mn—Zn ferrite, a plurality of dihedral recesses 21 are cut with the aid of a revolving grindstone or electrolytic etching (FIG. 28). The upper side or surface 23 of the substrate 20 corresponds to the magnetic gap forming surface, and the recess 21 is formed at a portion of the substrate 20 where the magnetic gap is to be formed. The recess 21 may also be polyhedral and provided with curved portions, as in the preceding embodiment.

Figure 29:
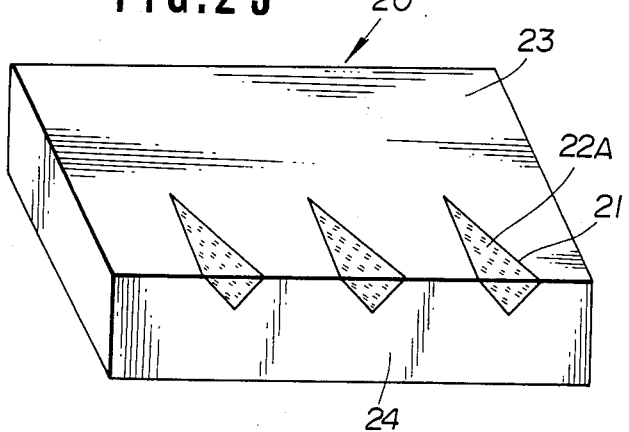
Figure 30:
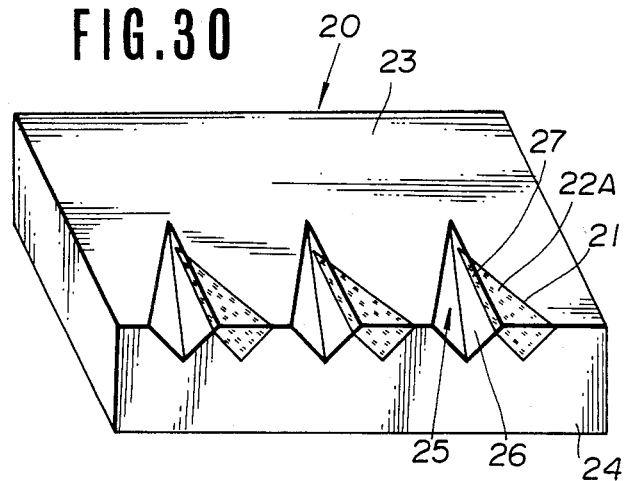

Glass having high melting point is packed in molten state in the recess 21 at 22A and both the upper side 23 and the front side 24 are ground smooth (FIG. 29). On the same ridge 25 are then formed a second plurality of dihedral recesses 25 adjacent to said recesses 21 filled with glass packing 22A and so as to be partially overlapped with the recess 21 (FIG. 30). A part of the glass packing 22A is exposed on an inner wall side of facet 26 of the recess 25. A line of intersection 27 of the wall side 26 and the upper side 23 forms a right angle with the front side 24, while the inner wall side 26 makes an angle of say 45° with the upper side 23.

Figure 31:
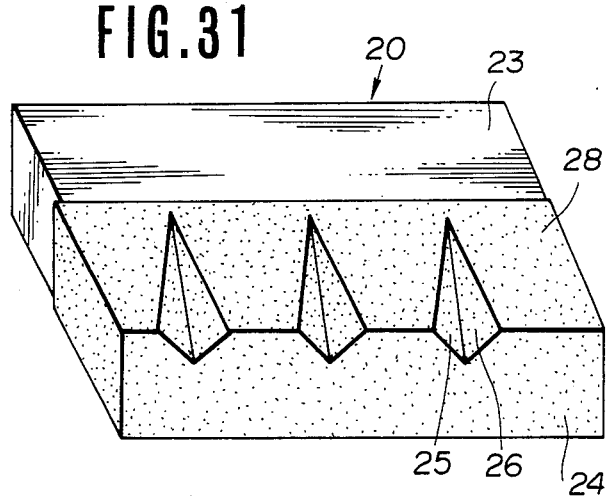

Next, a high permeability alloy such as Fe—Al—Si alloys is deposited in the neighborhood of the recesses 25 of the substrate 20 with the intermediary of an insulating film with the aid of a physical vapor deposition such as sputtering for forming a ferromagnetic metal thin film 28 (FIG. 31). The substrate 20 is placed at this time in the sputtering apparatus at an inclined position for more efficient depositing of the inner wall sides 26.

Figure 32:
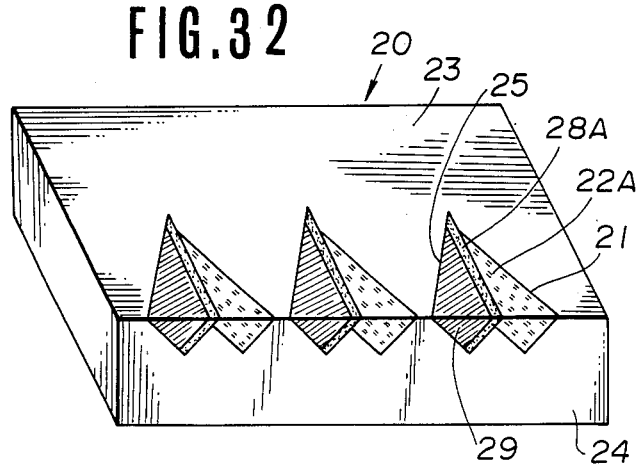

Then a glass packing 29 having a melting point lower than that of the glass packing 22 is packed in the molten state in the recesses 25 provided with the metal thin film 28, after which the upper side 23 and the front side 24 are ground to a mirror finish (FIG. 32). At this time, a part of the metal thin film 28 deposited during the preceding step remains on the wall sides 26 of the recesses 25 so that the ferromagnetic metal thin films 28A are deposited on the sides 26.

Figure 33:
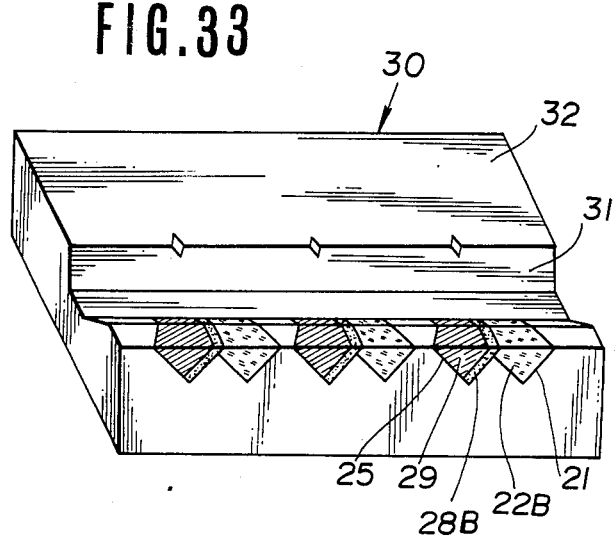

For forming a winding groove side core element, a groove 31 for coils is formed in the substrate 20 of ferromagnetic oxides shown in FIG. 32 for providing a substrate 30 of ferromagnetic oxides shown in FIG. 33. The recesses 21 of the substrate shown in FIG. 33 are filled with glass having high melting point 22B in the molten state, while the inner wall sides of the recesses 25 are provided with ferromagnetic metal thin films 28B.

The substrates 20, 30 are stacked and bonded together with molten glass, with the upper side 23 or the magnetic gap forming surface of the substrate 20 abutting on the upper side 32 or the magnetic gap forming surface of the substrate 30 with the medium of a gap spacer (FIG. 34) for providing a block 33 consisting of the substrates 20 and 30. The block 33 is then sliced along lines a—a, a'—a' for forming a plurality of head chips. The gap spacer may be formed of $SiO_2$, $ZrO_2$, $Ta_2O_5$ or Cr, as desired.

The contact surface with the tape of the head chip is then subjected to cylindrical grinding for forming a magnetic transducer head as shown in FIG. 26. The core elements 10 and 11 of the magnetic transducer head shown in FIG. 26 are derived from the substrates 20 and 30, respectively. The non-magnetic packing materials 12A, 12B correspond to the glass packing materials having high melting point 22A, 22B, respectively, while the non-magnetic packing material 13 corresponds to the glass packing material having low melting point 13. The ferromagnetic metal thin films 14A, 14B of the magnetic transducer head correspond to the metal thin films 28A, 28B, while the opening for coils 15 corresponds to the groove for coils 31 on the substrate.

Figure 35:
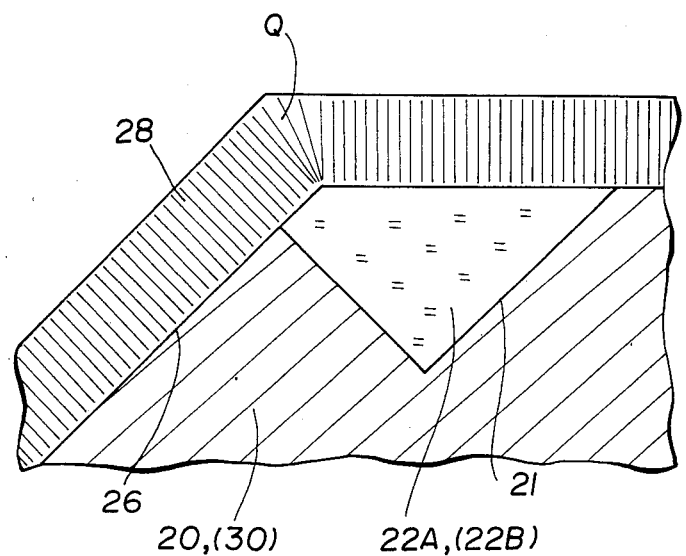
FIGS. 35 and 36 are schematic sectional views showing the orientation of the columnar crystal growth of the ferromagnetic metal film (Fe—Al—Si alloys film) formed on the substrate at the process steps shown in FIGS. 31 and 32, respectively.
Figure 36:

In the above described magnetic transducer head, a portion Q of the metal thin film 28 of the non-uniform film structure formed during the process step shown in FIG. 31 is removed by the grinding operation of the gap surface, as schematically shown in FIGS. 35, 36 showing the orientation of columnar crystal growths or film structure of the ferromagnetic metal thin film, for example, the Fe—Al—Si alloys film. In this manner, only the metal thin films 28A, 28B of the uniform structure are left on a sole inclined planar surface which is the inner wall side or facet 26 of the recess 25. The result is that each portion of the metal thin films 28A, 28B exhibits high magnetic permeability along the path of magnetic flux and the magnetic transducer head has a high and stable playback output.

In the present embodiment, as described hereinabove, a second planar surface forming an angle of 20° to 80° with respect to a first planar surface which later forms the magnetic gap surface is formed by the grinding process and in the neighborhood of the first recess 21 filled previously with glass having high melting point, and the ferromagnetic metal thin film 28 is formed by a physical vapor deposition on said second surface which is inclined with respect to said first planar surface, which is then ground so that only the thin film formed on the inclined second planar surface is left at least in the vicinity of the magnetic gap. The result is that the metal thin films 28A, 28B are of uniform film structure throughout thus providing for a high and stable output of the magnetic transducer head.

With the above magnetic transducer head, the ferromagnetic oxides of the two core elements are melt-bonded together directly with molten glass on the rear junction sides or back gap surfaces of the head. The result is that the head chip shows an improved breaking strength and can be manufactured easily with an improved yield rate.

Referring to FIGS. 37 to 44, a further example of the magnetic transducer head manufactured by a further process is explained.

Figure 37:
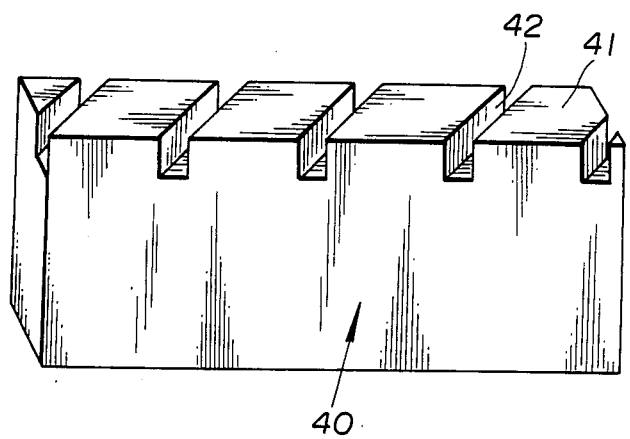
FIGS. 37 to 43 are perspective views showing the sequential steps for the manufacture of a magnetic transducer head according to a further modification.

On an upper surface 41 corresponding to the contact surface with the tape of the substrate 40 of ferromagnetic oxides, such as Mn—Zn ferrite, a plurality of grooves 42 having the square shaped section are obliquely formed (FIG. 37). Each groove 42 has a depth to reach the opening for coils provided in the transducer head.

Figure 38:
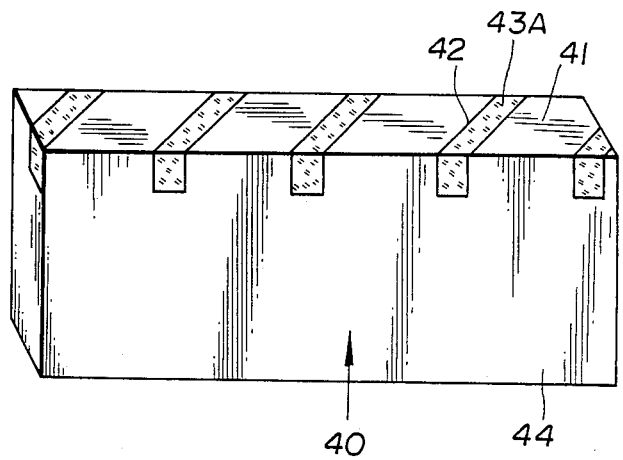

Glass having high melting point is then packed in molten state at 43A in each groove 42, after which the upper side 41 and the front side 44 are ground smooth (FIG. 38).

Figure 39:
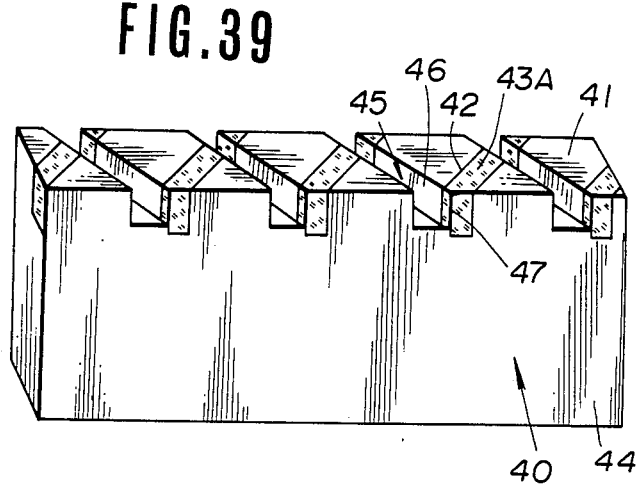

Then, a second plurality of grooves 45 having the square shaped section are formed on the upper side 41 in the reverse oblique direction to the grooves 42 so as to partially overlap with these grooves 42 filled with glass having high melting point 43A (FIG. 39). These grooves 45 are approximately equal in depth to the glass-packed grooves 42. The line of intersection 47 the inner side 46 of the groove 45 makes with the front side 44 is situated on the sectional plane of the glass 43A exposed on the front side 44 and forms a right angle with the upper side 41. The inner side 46 makes an angle of say 45° with the front side 44.

Figure 40:
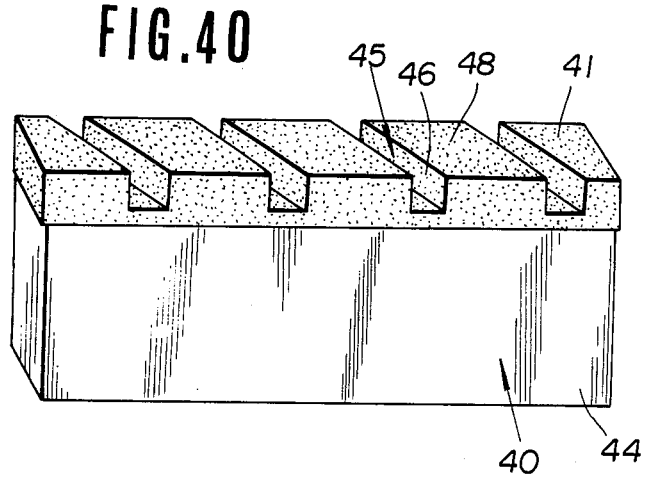

Then, a film of high permeability alloy, such as Fe—Al—Si alloys, is formed in the vicinity of the grooves 44 on the substrate 40 by a physical vapor deposition, such as sputtering, for forming a ferromagnetic metal thin film 48 (FIG. 40). The substrate 40 is maintained at an inclined position within the sputtering apparatus for more efficient form of the film on the inner side 46.

Figure 41:
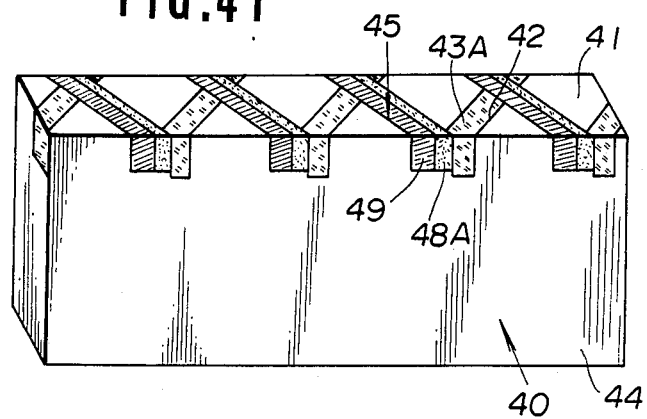

Then, a glass 49 having lower melting than the glass 43A is packed in molten state in the grooves 45 provided with the metal thin film 48, after which the upper and front sides 41, 44 are ground to a mirror finish (FIG. 41). At this time, a part of the metal thin film 48 is left on the inner sides 46 of the grooves 45 so that the ferromagnetic metal thin film 48A is provided on these inner sides 46.

Figure 42:
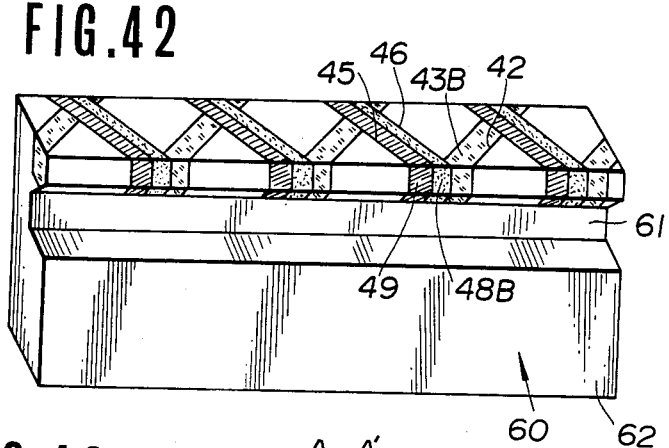
Figure 43:
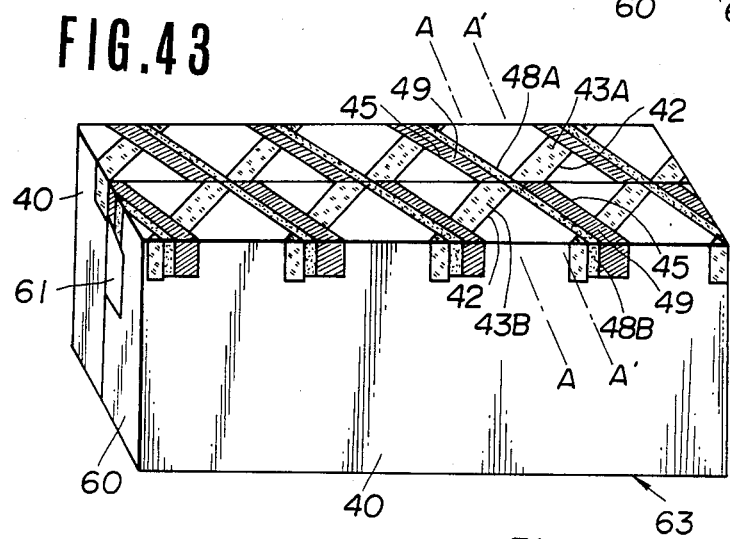

For forming the core element provided with a groove for coils 61, the groove 61 is formed on the substrate 40 of ferromagnetic oxides as shown in FIG. 41 for producing the substrate 60 of ferromagnetic oxides as shown in FIG. 42. The grooves 42 of the substrate 60 are packed with glass having high melting point 43B in molten state, while the ferromaganetic metal thin films 48B are formed on the inner sides 46 of the grooves 45.

The substrates 40, 60 are then stacked and bonded together by molten glass with the front side 44 of the substrate 40 which later forms the magnetic gap abutting on the front side 62 of the substrate 60 which later forms the gap by the medium of a gap spacer (FIG. 43) for providing a block 63 consisting of the substrates 40 and 60. The block 63 is then sliced along lines A—A, A'—A' for forming a plurality of head chips.

Figure 44:
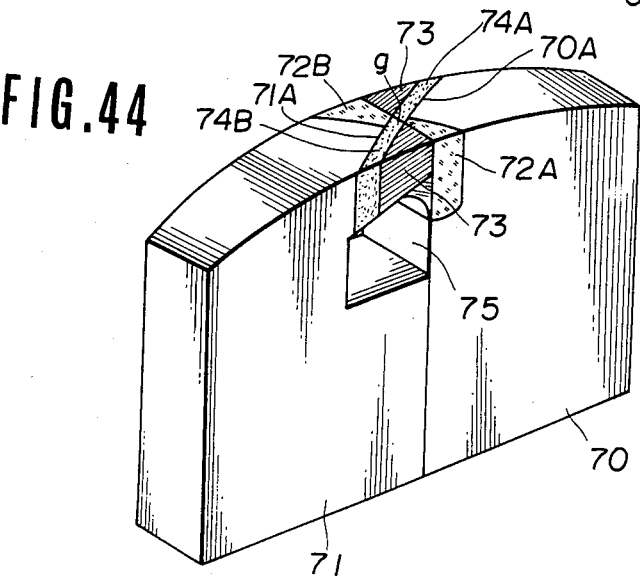
FIG. 44 is a perspective view showing a magnetic transducer head manufactured by the process steps shown in FIGS. 37 to 43, respectively.

The contact surface with the magnetic tape of the head chip is then subjected to cylindrical processing for forming a magnetic transducer head shown in FIG. 44. The core elements 70, 71 of the magnetic transducer head shown in FIG. 44 are derived from the substrates 40, 60 respectively. The non-magnetic packing materials 72A, 72B correspond to the glass materials having high melting point 43A, 43B filled in the grooves 42, while the non-magnetic packing material 73 corresponds to the glass material 49 having low melting point packed into the grooves 45. The ferromagnetic metal thin films 74A, 74B formed on the magnetic transducer head correspond to the metal thin films 48A, 48B formed on the inner sides 46 of the grooves 45, while the opening for coils 75 corresponds to the groove for coils 61.

With the magnetic transducer head of FIG. 44 manufactured with the above described process, the planar surface forming the magnetic gap is inclined at an appropriate angle with respect to the planar surface of the ferromagnetic metal thin films 74A, 74B, which are formed only in the vicinity of the magnetic gap, thus affording the properties of the magnetic transducer head comparable to those of the magnetic transducer head shown in FIG. 26.

Since the magnetic gap g is formed only by metal thin films 74A, 74B, the head is improved in out-put and compatible with metal tapes.

The metal thin film 74A is formed on a continuous planar surface consisting of the side 70A of the projecting portion of the core element 70 and a side of the non-magnetic material 72A, whereas the metal thin film 74B is formed on a continuous planar surface consisting of the side 71A of the projecting portion of the core element 71 and a side of the non-magnetic material 72B. The result is that the metal thin films 74A, 74B are of uniform film structure throughout and exhibit high magnetic permeability along the path of magnetic flux so that an improvement is achieved in the recording characteristics and playback output of the transducer head.

Figure 34:
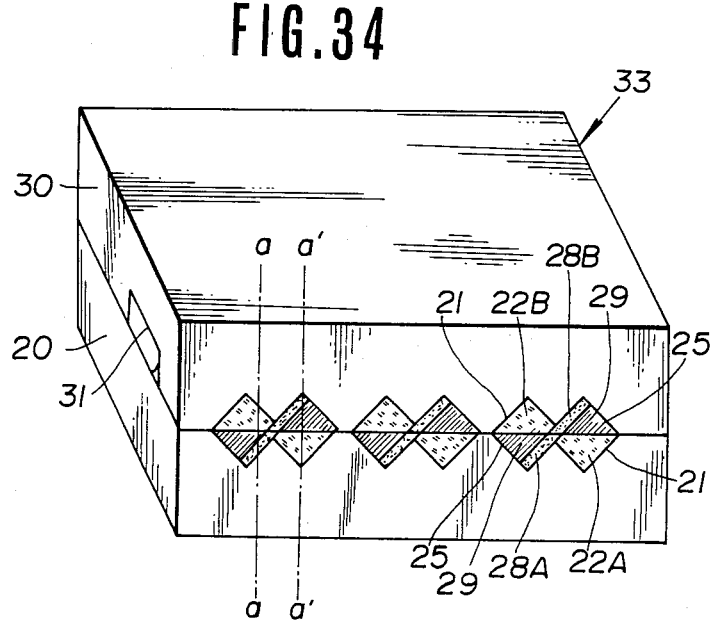

In the preceding embodiment, the lines a—a, a'—a' along which the composite block shown in FIG. 34 is sliced are at right angles with the abutting surfaces of the substrates 20 and 30. It is however possible to slice the block in a direction other than the right angle for providing a magnetic transducer head for azimuth recording. It is also possible in the present embodiment to slice the block shown in FIG. 43 in an inclined direction with respect to the abutting surfaces of the substrates 40, 60 instead of along lines A—A, A'—A' or at right angles with said abutting surfaces for similarly producing magnetic transducer heads for azimuth recording.

With the magnetic transducer head of the present invention shown in FIGS. 14, 26 and 44, grooves formed on the substrate of ferromagnetic oxides are previously packed with glass and second grooves are formed in the neighborhood of the first grooves for forming inclined planar surfaces on which to form ferromagnetic metal thin films. The result is that magnetic properties of the head are uniform not only in the film portions adjacent to the magnetic gap but in the film portions on the sides of the projecting substrate portion and the ferromagnetic oxides are not exposed on the magnetic gap portion.

Figure 3:
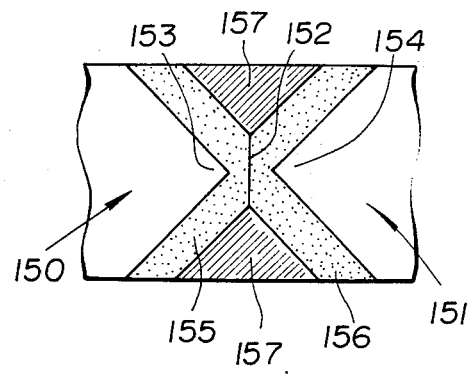
FIG. 3 is a plan view showing to an enlarged scale the tape contacting surface of a conventional magnetic head.
Figure 4:
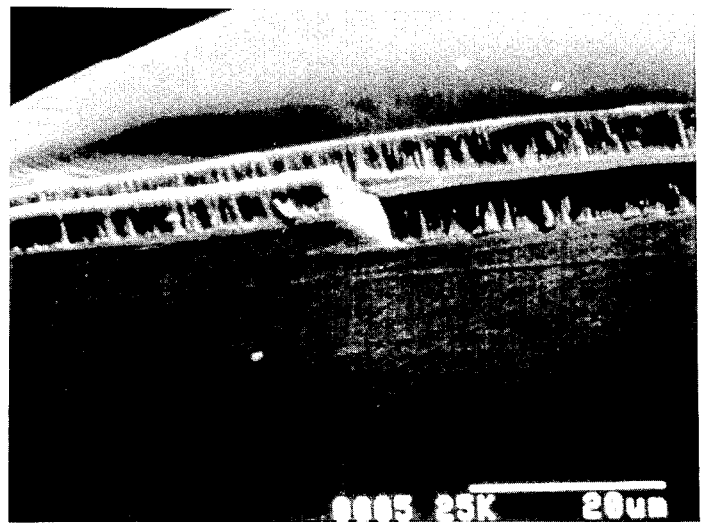
FIG. 4A is an SEM photograph showing a crystalline structure of the two-layered Sendust film formed by sputtering on a planar ferrite substrate surface.
FIG. 4B is a sketch showing only the outstanding feature of the SEM photograph of FIG. 4A.
Figure 4:
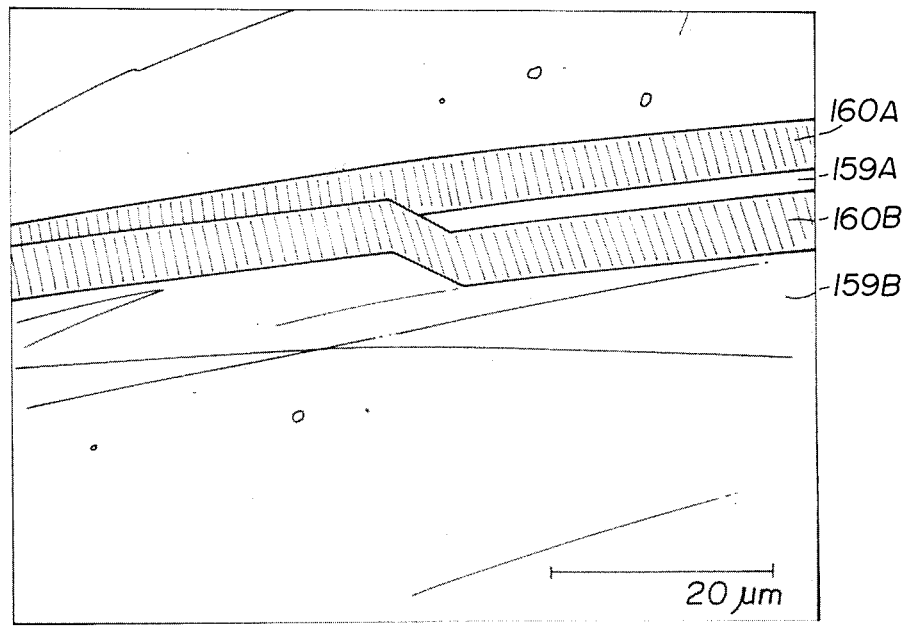
Figure 5A:
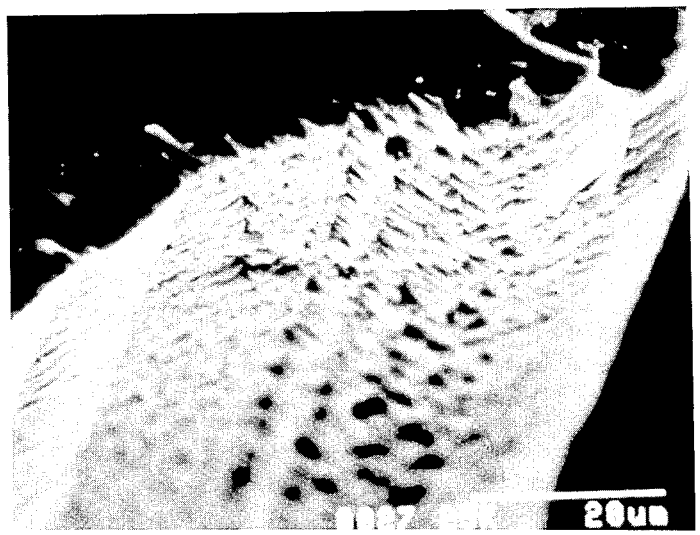
FIG. 5A is an SEM photograph showing a crystalline structure of the Sendust film formed by sputtering on an irregular ferrite substrate surface.
Figure 5B:
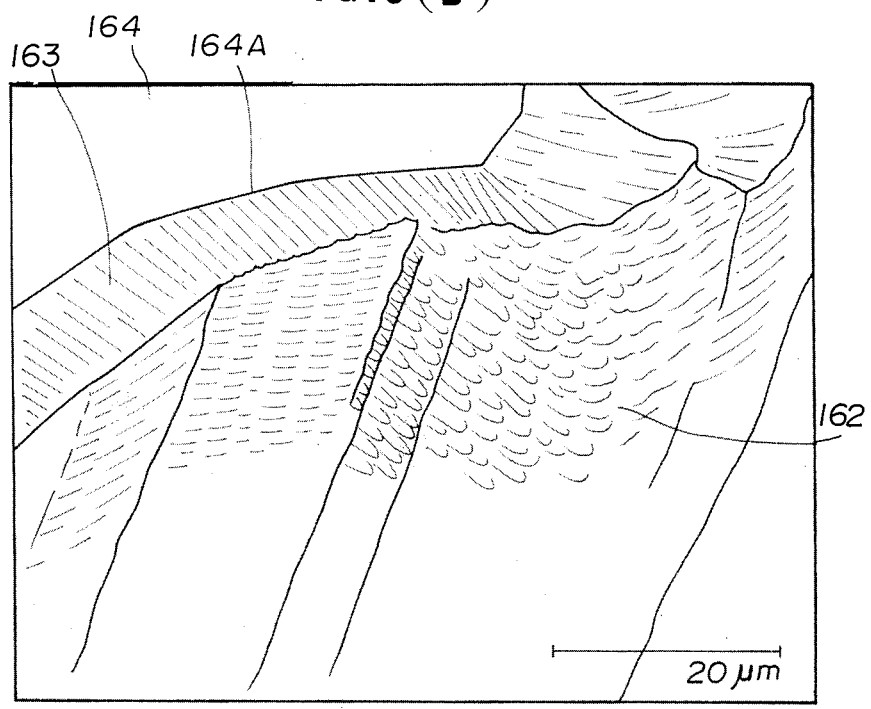
FIG. 5B is a sketch showing only the outstanding features of the SEM photograph of FIG. 5A.
Figure 6:
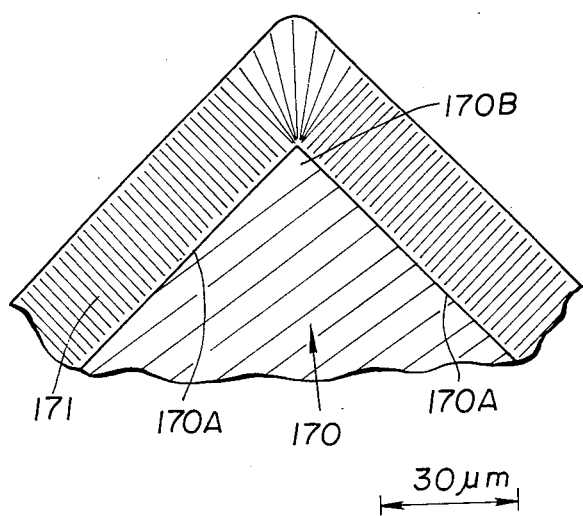
FIGS. 6 to 10 are schematic sectional views showing the manufacture process of the convention magnetic transducer head and particularly the orientation of the columnar crystal growths of, for example, the Sendust film formed on projecting ferrite portions.
Figure 7:
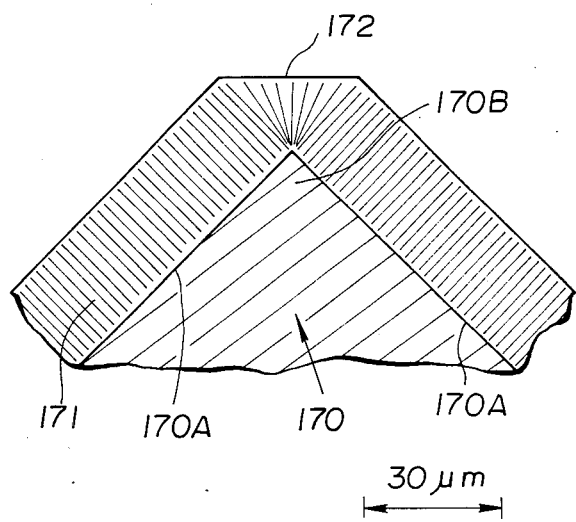
Figure 8:
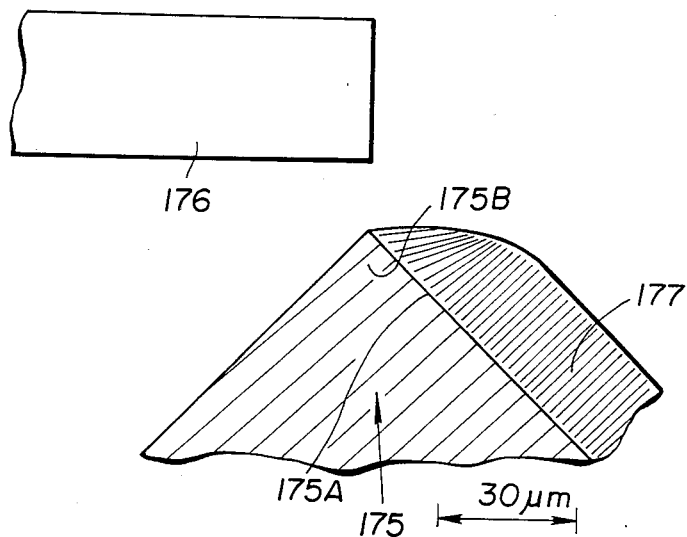
Figure 9:
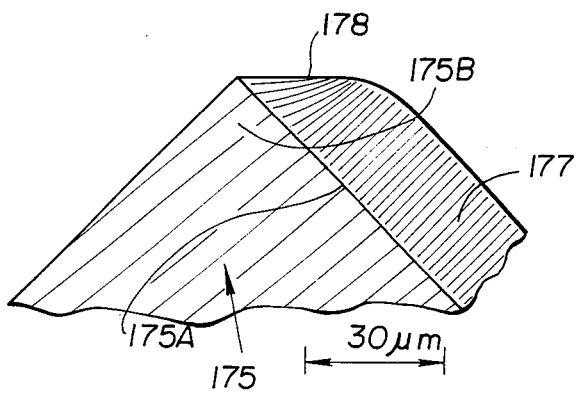
Figure 10:
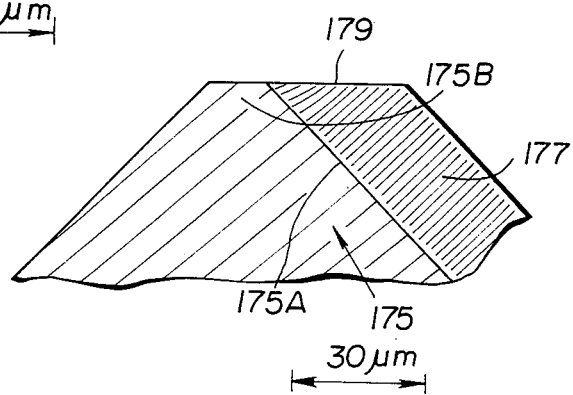
Figure 11:
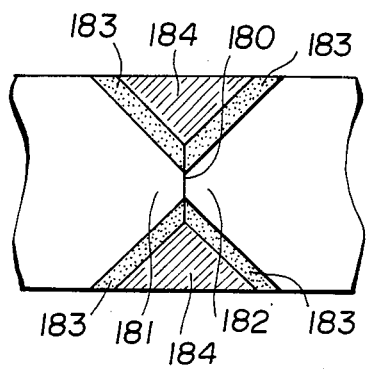
FIGS. 11 and 12 are enlarged plan view showing contact surfaces with the tape of the conventional magnetic transducer heads.
Figure 12:
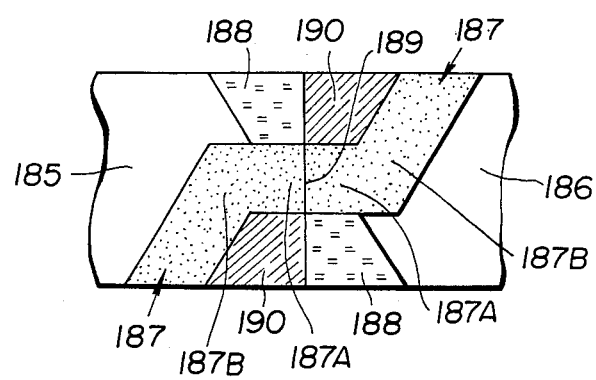
Figure 13:
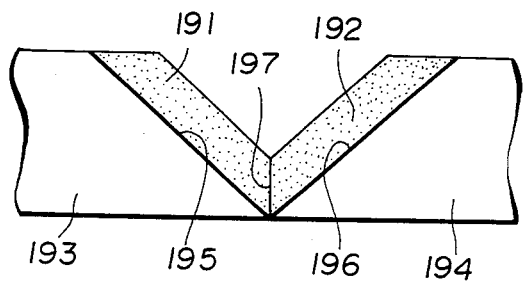
FIG. 13 is an enlarged plan view showing the contact surface with the tape of a further conventional magnetic transducer head.

When used with high coercive force magnetic tape such as metal tape, the magnetic transducer head of the present invention was found to have a playback output higher by about 3 dB in the frequency range of 1 to 5 MHz as compared to the experimental values obtained with the conventional magnetic transducer head such as shown in FIG. 11 wherein the ferrite is exposed in the gap portion for a length equal to e.g. 40 percent of the track width. The magnetic transducer head of the present invention may be manufactured with lesser dimensional fluctuations than in the case of the conventional magnetic transducer head shown in FIG. 3 and was found to have playback output higher about 3 dB than that of this conventional transducer head.

The Ni—Zn ferrite, for example, may be used in place of the Mn—Zn ferrite as the ferromagnetic oxide forming the core elements. Permalloy or amorphous alloys may be used in place of Fe—Al—Si alloys as the high permeability magnetic material forming the ferromagnetic metal thin film, as discussed hereinabove.

In using the amorphous alloys, uniform film properites of the ferromagnetic metal thin film is impared by magnetic anisotropy. The matal thin film may have uniform magnetic properties throughout by forming the thin film on a sole planar surface in accordance with the present invention.

The ferromagnetic metal thin film may be advantageously composed of one or more layers within the scope of the present invention.

It will be appreciated from the foregoing that the magnetic transducer head of the present invention is composed of two core elements formed of ferromagnetic oxides, and the ferromagnetic metal thin films are deposited by physical vapor deposition in proximity to the junction surface of the core elements so that the general plane of these metal thin films is inclined at an angle with respect to the junction surface of the core elements which later forms the magnetic gap surface. The magnetic gap is formed solely by the metal thin films which are formed on a common planar surface.

Hence, when forming the metal thin films, there is no necessity of providing a film thickness corresponding to the track width and the transducer head may be mass produced within a shorter time.

The major portion of the contact surface with the tape is formed of ferromagnetic oxides so that the head has superior wear resistance.

The magnetic gap is formed only of the metal thin film so that the head is high in output and compatible with the high coercive magnetic tape such as metal tape.

The metal thin film is formed on one planar surface and hence uniform in the film structure throughout, while the metal thin film as a whole exhibits high magnetic permeability along the path of magnetic flux. Hence, the magnetic transducer head is extremely reliable in operation and has a high recording characteristics and playback output.

The magnetic transducer head of the present invention is so constructed that the magnetic gap is at the center of the head chip and surrounded on both sides with nonmagnetic materials for avoiding local wear of the head.

The ferromagnetic metal thin films forming the magnetic gap is formed on a straight line when seen on the contact surface with the tape so that the ferromagnetic metal thin films are not in opposition to each other in other locations than the magnetic gap. The result is the reduced crosstalk in the long wavelength range. The crosstalk may be further lowered by changing the groove profile with respect to the core elements.

The uniform magnetic properties may be assured by the unidirectional growth of the columnar structure of the ferromagnetic metal thin films when seen on the contact surface with the tape.

What is claimed is:

1. A magnetic transducer head comprising:
   a first magnetic core element, and a second magnetic core element,
   each of said first and second core elements comprising a magnetic ferrite block and a magnetic metal thin film integrated with said magnetic ferrite blocks,
   each of said core elements having a first planar surface and a second planar surface portion adjacent to and at an angle with respect to said first planar surface,
   said magnetic metal thin film on said first core element being provided on said second planar surface portion of said first core element and facing an edge thereof to said first planar surface of said first core element, said second planar surface portion of said first core element being slantly provided with respect to said first planar surface of said first core element,
   said magnetic metal thin film on said second core element being provided on said second planar surface portion of said second core element and facing an edge thereof to said first planar surface of said second core element, said second planar surface portion of said second core element being slantly provided with respect to said first planar sruface of said second core element,
   said first and second core elements being bonded together in such manner than an operating magnetic gap is formed between said edge of said magnetic metal thin film on said first core element and said edge of said magnetic metal thin film on said second core element, said magnetic metal thin film on said first core element and said magnetic thin film on said second core element being in only a single common plane and forming a track width of said operating magnetic gap larger than the thickness of said magnetic metal thin film, and a common contact surface facing to a travelling magnetic recording medium is formed by said first and second core elements, said metal thin film on said first core element defining a first notch with said first planar surface of said second core element, and said metal thin film on said second core element defining a second notch with said first planar surface of said first core element, said first and second notches being filled with non-magnetic material and defining the width of said magnetic gap.

2. A magnetic transducer head comprising, first and second magnetic core elements bonded together, each core element having a first planar surface and a second planar surface joined at an angle with respect to said first planar surface to form an edge, an operating magnetic gap formed between said edges of said respective core elements, and a common contact surface formed by said first and second core elements facing to a travelling magnetic recording medium, said gap extending substantially perpendicular to said contact surface forming a depth of said operating magnetic gap,
   each of said magnetic core elements being formed of a magnetic ferrite block, and a magnetic metal thin film formed on said second planar surface of each of said magnetic ferrite blocks,
   said magnetic metal thin film being provided such that first portions of said magnetic metal thin film appearing on said second planar surface of each of said magnetic core elements extend parallel to a direction of said depth, and second portions appearing on said second planar surface of each of said magnetic core elements at said contact surface extend along a common line having an angle not equal to a right angle to said operating magnetic gap as viewed on said contact surface,
   said core elements being bonded together such that said operating magnetic gap is formed between said first portions appearing on said second planar surface of each of said magnetic core elements, and said second portions align in a common straight line and forming a track width of said operating magnetic gap larger than the thickness of said magnetic metal thin film,
   said metal thin film on said first core element defining a first notch with said first planar surface of said second core element, and said metal thin film on said second core element defining a second notch with said first planar surface of said first core element, said first and second notches being filled with non-magnetic material and defining the track width of said operating magnetic gap.

3. A magnetic transducer head according to claims 1 or 2, wherein said operating magnetic gap is provided at the central portion of said contact surface.

4. A magnetic transducer head according to claims 1 or 2, wherein said angle between said respective first planar surface and said second planar surface as viewed on said contact surface is between 20° and 80°.

5. A magnetic transducer head according to claims 1 or 2, further comprises an opening for a coil winding provided on at least one of said, core elements facing to said respective first planar surface, dividing said operating magnetic gap and a back gap, and a coil wound through said opening.

6. A magnetic transducer head according to clain 5, wherein said magnetic metal thin film is provided to extend to said back gap.

7. A magnetic transducer head according to clain 5, wherein said back gap is formed between each of said ferrite blocks of said core elements.

8. A magnetic transducer head according to claims 1 or 2, wherein said magnetic metal thin film has substantially uniform columnar structure over entire area of said magnetic metal thin film.

9. A magnetic transducer head according to claims 1 or 2, wherein said magnetic metal thin film is a crystalline alloy.

10. A magnetic transducer head according to claims 1 or 2, wherein said magnetic metal thin film is Fe—Al—Si alloys.

11. A magnetic transducer head according to claims 1 or 2, wherein said magnetic metal thin film has substantially uniform characteristics of magnetic anisotropy over entire area of said magnetic metal thin film.

12. A magnetic transducer head according to claims 1 or 2, wherein said magnetic metal thin film is an amorphous alloy.

13. A magnetic transducer head according to claims 1 or 2, wherein said magnetic metal thin film is a metal-metalloid amorphous alloy.

14. A magnetic transducer head according to claims 1 or 2, wherein said magnetic metal thin film is a metal-metal amorphous alloy.

15. A magnetic transducer head comprising:
a first magnetic core element, and a second magnetic core element,
each of said first and second core elements comprising a magnetic ferrite block and a magnetic thin film integrated with said magnetic ferrite blocks,
each of said core elements having a first planar surface and a second planar surface portion adjacent to said first planar surface,
said magnetic metal thin film on said first core element being provided on said second planar surface portion of said first core element and facing an edge thereof to said first planar surface of said first core element, said second planar surface portion of said first core element being slantly provided with respect to said first planar surface of said first core element to form an angle therebetween,
said magnetic metal thin film on said second core element being provided on said second planar surface portion of said second core element and facing an edge thereof to said first planar surface portion of said second core element, said second planar surface portion of said second core element being slantly provided with respect to said first planar surface of said second core element to form an angle therebetween,
said first and second core elements being bonded together in such manner that an operating magnetic gap is formed between said edge of said magnetic metal thin film on said first core element and said edge of said magnetic metal thin film on said second core element, said magnetic metal thin film on said first core element and said magnetic thin film on said second core element being in one common plane and forming a track width of said operating magentic gap larger than a thickness of said magnetic metal thin film, and a common contact surface facing a travelling magnetic recording medium formed by said first and second core elements, said metal thin film on said first core element defining one side of a first notch on said first core element and said metal thin film on said second core element defining one side of a second notch on said second core element, said first and second notches being filled with a first non-magnetic material, a third notch provided on said second core element filled with a second non-magnetic material which is contiguous to said first notch, and a fourth notch provided on said first core element filled with said second non-magnetic material which is contiguous to said second notch, whereby said notches form a pair of non-magnetic material portions on both sides of magnetic thin film, one of said non-magnetic material portions being formed of said first and third notches, and another of said non-magnetic material portions being formed of said second and fourth notches.

16. A magnetic transducer head according to claim 15, wherein said operating magnetic gap is provided at the central portion of said contact surface.

17. A magnetic transducer head according to claim 15, wherein said angle between said respective first planar surface and said second planar surface as viewed on said contact surface is between 20° and 80°.

18. A magnetic transducer head according to claim 15, further comprises an opening for a coil winding provided on at least one of said core elements facing to said respective first planar surface, dividing said operating magnetic gap and a back gap, and a coil wound through said opening.

19. A magnetic transducer head according to claim 18, wherein said magnetic metal thin film is provided to extend to said back gap.

20. A magnetic transducer head according to claim 18, wherein said back gap is formed between each of said ferrite blocks of said core elements.

21. A magnetic transducer head according to claim 15, wherein said magnetic metal thin film has substantially uniform columnar structure over entire area of said magnetic metal thin film.

22. A magnetic transducer head according to claim 15, wherein said magnetic metal thin film is a crystalline alloy.

23. A magnetic transducer head according to claim 15, wherein said magnetic metal thin film is a Fe—Al—Si alloy.

24. A magnetic transducer head according to claim 15, wherein said magnetic metal thin film has substantially uniform characteristics of magnetic anisotropy over entire area of said magnetic metal thin film.

25. A magnetic transducer head according to claim 15, wherein said magnetic metal thin film is an amorphous alloy.

26. A magnetic transducer head according to claim 15, wherein said magnetic metal thin film is a metal-metalloid amorphous alloy.

27. A magnetic transducer head according to claim 15, wherein said magnetic metal thin film is a metal-metal amorphous alloy.

28. A magnetic transducer head according to claim 15, wherein said first non-magnetic material is formed of a first non-magnetic glass having first melting point.

29. A magnetic transducer head according to claim 28, wherein said second non-magnetic material is a non-magnetic glass having a melting point higher than said first non-magnetic glass.

* * * * *